United States Patent [19]

Schoberg et al.

[11] Patent Number: 4,790,434
[45] Date of Patent: Dec. 13, 1988

[54] DATA CARTRIDGE STORAGE AND HANDLING SYSTEM

[75] Inventors: Carl J. Schoberg, Zumbro Falls; Daniel C. Johnson, Rochester, both of Minn.

[73] Assignee: Liberty Diversified Industries, New Hope, Minn.

[21] Appl. No.: 882,134

[22] Filed: Jul. 3, 1986

[51] Int. Cl.[4] .................. B65D 85/672; B65D 1/24
[52] U.S. Cl. .................. 206/387; 190/110; 206/564; 211/40; 220/21; 220/22.3; 312/12
[58] Field of Search .................. 109/56; 190/109, 110; 211/40, 41; 248/126; 206/387, 564, 558, 509, 561, 562, 565; 220/306, 22.3, 20, 22, 21; 229/52 A; 312/10, 12, 15, 107, 321, 198; 150/108

[56] References Cited

U.S. PATENT DOCUMENTS

| | | | |
|---|---|---|---|
| Re. 17,279 | 4/1929 | Copeman | 206/564 X |
| 1,423,078 | 7/1922 | Carlson | 206/564 X |
| 2,233,799 | 3/1941 | Seifer et al. | 229/52 A |
| 2,344,009 | 3/1944 | Trogman | 229/52 A |
| 2,501,379 | 3/1950 | Cranston | 206/561 X |
| 2,660,506 | 11/1953 | Wright | 206/564 X |
| 2,718,326 | 9/1955 | LeBlanc | 220/22.3 |
| 3,133,771 | 5/1964 | Dorman | 312/107 |
| 3,208,620 | 9/1965 | Herdering | 220/306 X |
| 3,391,816 | 7/1968 | Swett | 220/22 |
| 3,481,657 | 12/1969 | Farrall et al. | 206/564 X |
| 3,491,909 | 1/1970 | Ikelheimer | 190/109 X |
| 3,642,337 | 2/1972 | Manheim | 206/509 X |
| 3,710,900 | 1/1973 | Fink | 206/561 X |
| 3,847,275 | 11/1974 | Morrison et al. | 220/20 X |
| 3,907,116 | 9/1975 | Wolf et al. | 211/40 |
| 4,061,224 | 12/1977 | Fuhri | 220/22 X |
| 4,117,931 | 10/1978 | Berkman | 206/561 X |
| 4,124,261 | 11/1978 | Klaus | 211/42 X |
| 4,133,449 | 1/1979 | Ostrowsky | 220/306 X |
| 4,512,468 | 4/1985 | Stravitz | 206/387 |

Primary Examiner—Stephen Marcus
Assistant Examiner—Byron Gehman
Attorney, Agent, or Firm—Moore & Hansen

[57] ABSTRACT

A data cartridge handling system comprising a plurality of carrying cases, each case having a base, a hinged lid, and a carrying handle, and each being of suitable dimensions to house an insertable partitioned tray designed to hold a predetermined number of data tape cartridges having one of a variety of sizes. The cases may be removably inserted into a shelving module by sliding the case horizontally between spaced supports, and the entire system may be placed on a desktop or inverted and mounted under a desk or table.

6 Claims, 2 Drawing Sheets

U.S. Patent    Dec. 13, 1988    Sheet 1 of 2    4,790,434
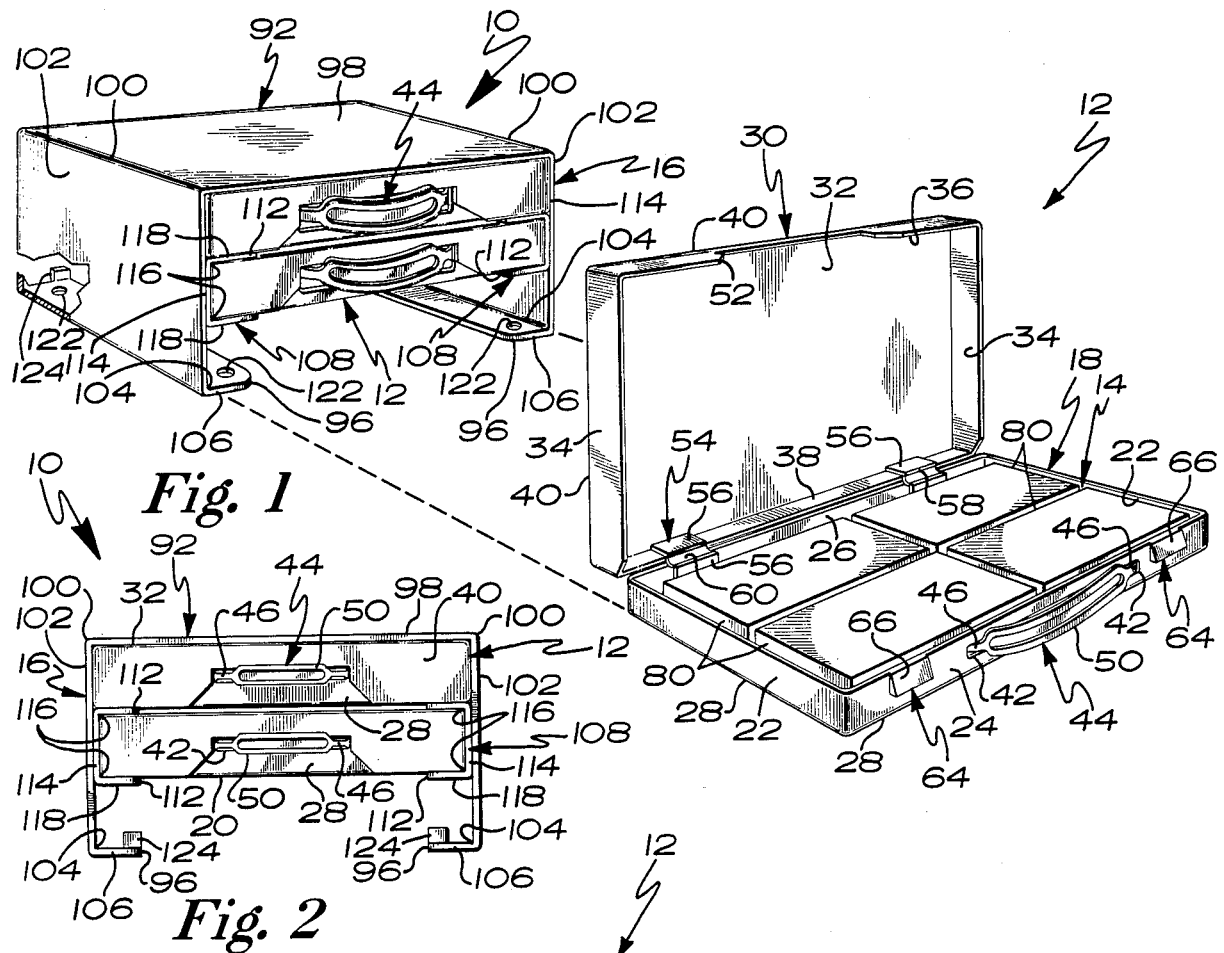
Fig. 1
Fig. 2
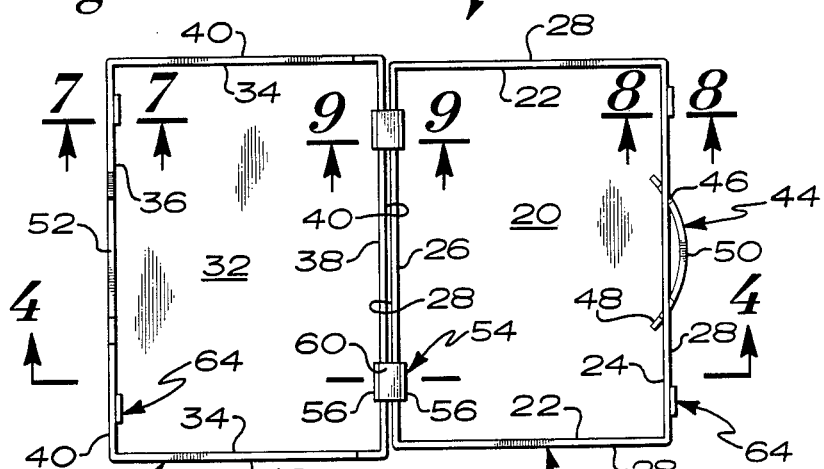
Fig. 3
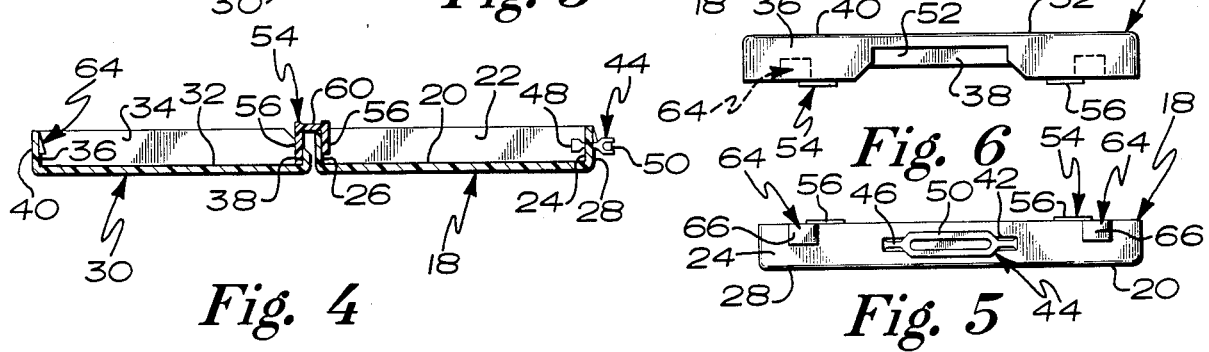
Fig. 4
Fig. 6
Fig. 5

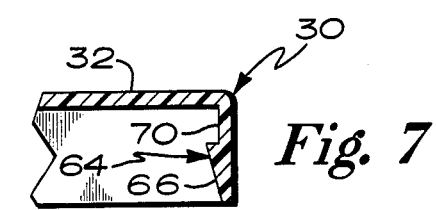
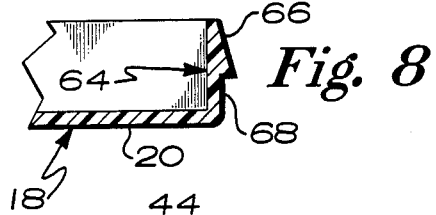
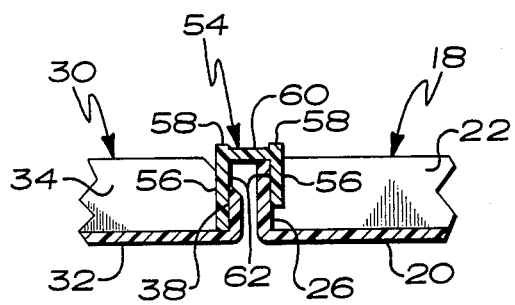
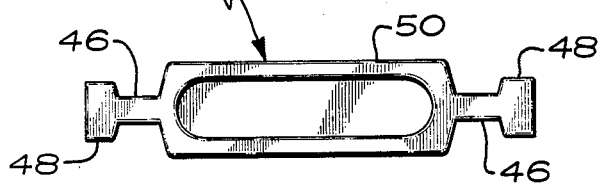
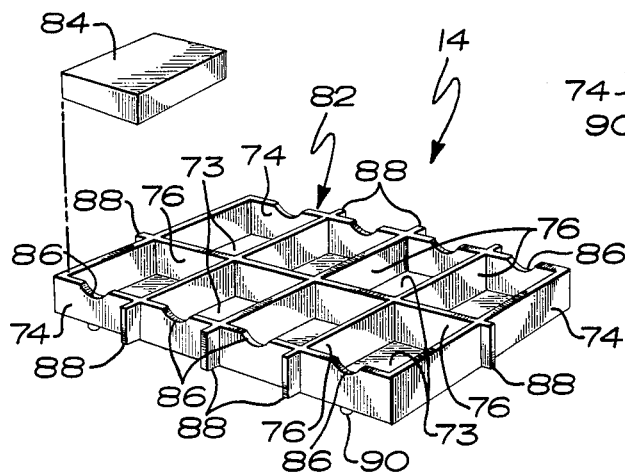
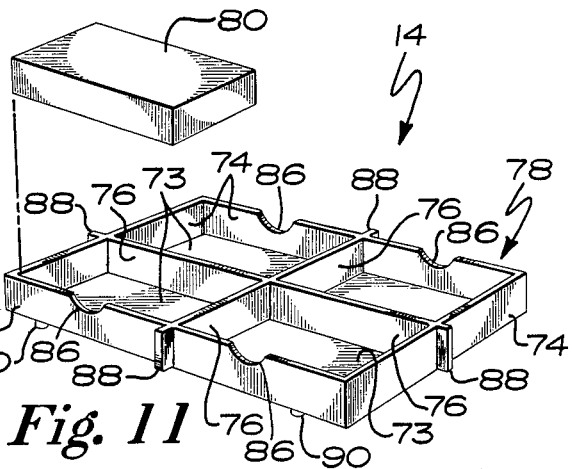
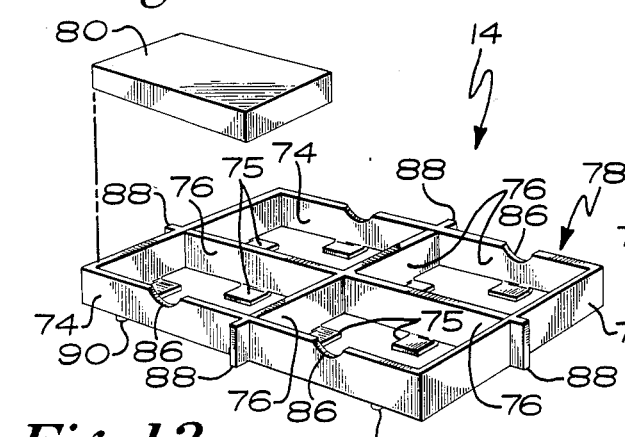
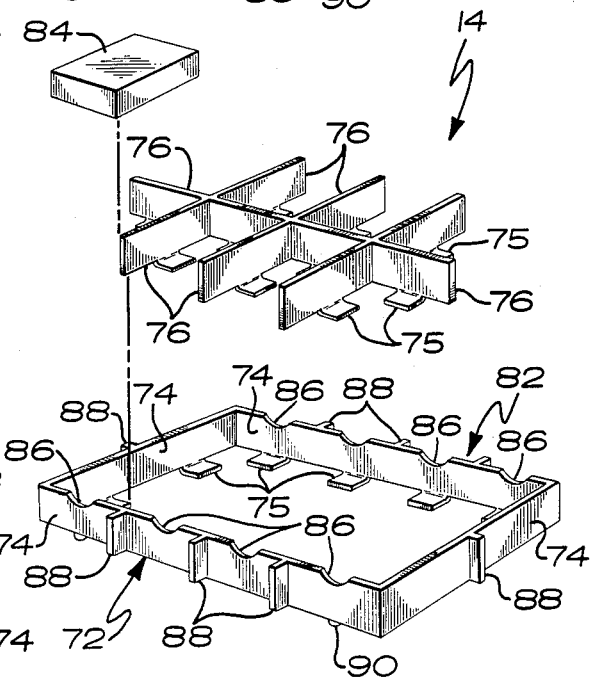

DATA CARTRIDGE STORAGE AND HANDLING SYSTEM

BACKGROUND OF THE INVENTION

This invention relates to a data tape cartridge storage and handling system, and more specifically to the combination of a portable carrying case and shelving module for that case.

Systems used for both storing and transporting tape cartridges are known to the art, as are cases for carrying data or "floppy" disks which may also be converted for use as desktop storage and filing.

One existing design for a case to store and transport tape cartridges consists of a rectangular box slightly deeper and wider than a tape cartridge resting on its end. The case has a series of vertical slots into which a person may slide the tape cartridges, and is usually equipped with a hinged or sliding lid and a carrying handle. These cases are popular for recreational use, such as storing a limited number of cassette music tapes to which a person may want to listen at home, on their car stereo, at work, or at an event away from their home.

A limitation to this design is that only a single size of tape cartridge may be placed in the case because of the orientation of the tape and the dimensions of the slots. Thus, separate cases are manufactured for micro, cassette, 8-track, data, video, and other tape cartridges, and a separate case is purchased for each use. A second limitation to this design is the fact that if a person wishes to transport the tape cartridges, they must take all the cartridges with them. A third limitation to using such a design with data tape cartridges is that the cases are not dust-tight, a requirement peculiar to data cartridges where even small amounts of dust can damage a tape and destroy all the valuable contents of data or programming files.

Another existing design for a tape cartridge storage unit consists of a series of slidably interlocking tape cartridge boxes, each box being equipped with a spring loaded drawer and a push-button catch release. Any number of these boxes may be connected together in a stack, and a certain number may then be disconnected from the stack to be transported. The unit may be placed on a desk top, and when a person touches the push-button catch release for a given drawer, that drawer slides out to permit a tape to be inserted or removed.

This design permits a person to view the label on only one cartridge at at time, and has the similar limitation that only one size tape cartridge may be used in the unit. The system does eliminate the problem of not being able to transport less than all of the stored tape cartridges, but having to disconnect and reconnect several boxes each time a person wishes to select certain tape cartridges, especially if they need only a few of the cartridges from various points in the stack, proves to be very cumbersome and time consuming. Furthermore, since each box may be separately disconnected and reconnected in a different location, the system cannot be equipped with a carrying handle or a cover to protect the push-button catch releases from being accidentally struck. These factors make such a system undesirable for use in transporting data cartridges.

The designs for storing and transporting data or "floppy" disks include ring binders having insertable plastic sheets with envelopes to hold the disks, plastic booklike disk pouches with a retaining rim on one cover to hold a stack of disks in place and a second larger rim on the other cover which is pressed into place over the first rim to close the case, and "flip-up" files which have a disk tray connected to a hinged cover so that the tray may be folded inside for storing or transporting disks, or the entire unit may be unfolded to form a triangular desktop stand for the disks when in use, an example of which is shown in U.S. Pat. No. 4,586,603.

Hinged plastic mailing boxes for tape cassettes are known, but they are designed to hold one tape per box, and incorporate spaced projections extending through the reel hubs of the tape cassette to hold the cassette in place during mailing, thus preventing their use with data cartridges which have a protective housing.

Booklike pouches with force fitting retaining rims and vacuum formed plastic liners have also been used to store and ship tape cassettes, along with each other times such as typewriter elements, electronic components, and drafting supplies. These cases are most frequently employed as point-of-sale displays, or to prevent the theft of easily concealable items.

None of the above designs incorporate carrying handles, and only the ring binder method allows use with varying size disks such as 3½, 5¼, or 8 inch by inserting plastic sheets with different sized envelopes. Each design requires a person to transport all the disks stored in the system at one time, and each requires desktop or bookshelf storage space that could otherwise be more effectively utilized.

BRIEF SUMMARY OF THE INVENTION

One object of this invention is to design a dust-tight data tape cartridge storage and handling system that allows the use of more than one size of tape cartridge in the same system.

A second object of this invention is to design the above data cartridge handling system to permit a person to selectively transport a given number of the tape cartridges less than or equal to the total number of cartridges that are stored in the system.

Another object of this invention is to design the above data cartridge handling system so that several cartrides may be viewed simultaneously, and a certain number may be quickly selected to be transported, with the remainder left in the storage unit.

Still another object of this invention is to design the above data cartridge handling system so the entire system may be used as a desktop storage or filing unit, or may alternately be placed in a location where it will not consume storage space needed for other items.

Briefly described, the data cartridge handling system of this invention comprises a plurality of carrying cases, each case having a base, a hinged lid, and a carrying handle, and each being of suitable dimensions to house an insertable partitioned tray designed to hold a predetermined number of data tape cartridges having one of a variety of sizes. The cases may be removably inserted into a shelving module by sliding the case horizontally between spaced supports, and the entire system may be placed on a desktop or inverted and mounted under a desk or table.

These and other objects and advantages of the invention will be readily understood as the following description is read in conjunction with the accompanying drawings, wherein like reference numerals have been used to designate like elements throughout the several views.

BRIEF DESCRIPTION OF THE DRAWINGS

FIG. 1 is a perspective view of the data cartridge handling system of this invention with the lower of three cases being removed from the shelf module and opened;

FIG. 2 is a front elevation of the shelf module holding two cases;

FIG. 3 is a top view of an opened case;

FIG. 4 is a cross sectional view of the case taken through line 4—4 in FIG. 3;

FIG. 5 is a front elevation view of the case as viewed from line 5—5 in FIG. 3;

FIG. 6 is a front elevation view of the case lid as viewed with the case closed;

FIG. 7 is a cross sectional view of the top snap locks of the case taken through line 7—7 in FIG. 3;

FIG. 8 is a cross sectional view of the bottom snap locks of the case taken through line 8—8 in FIG. 3;

FIG. 9 is a cross sectional view of the hinge of the case taken through line 9—9 in FIG. 3;

FIG. 10 is an oblique view of the handle detached from the case;

FIG. 11 is a perspective view of the tray used for holding 5¼ inch data cartridges;

FIG. 12 is a perspective view of the tray used for holding 3½ inch data cartridges;

FIG. 13 is a perspective view of one embodiment of the tray having support tabs in place of the bottom tray panel; and FIG. 14 is an exploded perspective view of one embodiment of the tray in which the partitions are removable.

DESCRIPTION OF THE PREFERRED EMBODIMENTS

The data cartridge storage and handling system of this invention is shown in FIGS. 1–4 and referenced generally by the numeral 10.

The data cartridge storage and handling system 10 is composed of a case 12, a tray unit 14, and a shelving module 16.

The case 12 has a shallow, rectangular base 18 molded from a high impact plastic to include a horizontal base panel 20, two end walls 22, a front wall 24, and a back wall 26, each extending upward vertically from the edges 28 of the base panel 20 as shown in FIGS. 3–5.

The case 12 also has a similarly shallow, rectangular lid 30 molded form a high impact plastic to include a horizontal lid panel 32, two side lid walls 34, a front lid wall 36, and a back lid wall 38, each extending generally perpendicularly from the edges 40 of the lid panel 32 as shown in FIGS. 3, 4, and 6.

Referring to FIG. 4, it may be seen that the lid panel 32 should be larger than the base panel 20 in each horizontal direction by an amount of at least equal to twice the thickness of the various lid walls 32, 34, 36 which should all be the same thickness, thereby allowing the lid 30 to be inverted and slid snuggly over the base 18 with the base walls 22, 24, 26 inside the lid walls 32, 34, 36 and the lid panel 32 disposed above the base 18. To accomplish a close fit between the lid 30 and base 18, the lid 30 may be molded from a more flexible or resilient plastic than the base 18. The base 18 and the lid 30, or both, may have textured surfaces for aesthetic appeal if desired.

The base 18 has two small, rectangular slots 42 horizontally oriented and extending through the front wall 24, the slots 42 being spaced apart greater than the distance across the palm of an average sized human hand, and centered on the front wall 24. These slots 42 may also consist of a line of slots 42 extending across the front wall 42.

A handle 44, having a thin bridge 46 and securing tab 48 at each end of an intermediate handgrip section 50 as shown in FIG. 10, and molded from a flexible plastic, is attached to the base 18 by inserting each securing tab 48 through a slot 42 in the base 18 and turning the securing tab 48 ninety degrees. The slots 42 should therefore be as long as the securing tab 48 is wide, but narrow enough that the securing tab 48 cannot be pulled back through the slot 42 once the securing tab 48 has been turned. The handle 44 should be long enough that an average human hand could be inserted between the handgrip section 50 and the front wall 24 when each end of the handle 44 is connected to the base 18 as described, and the fingers of that hand curled around the handgrip region 50.

To permit the lid 30 to be fitted over the base 18 when the handle 44 is attached to the front wall 24, it is necessary to cut a handle opening 52 in the front lid wall 36 corresponding to the location of the handle 44. This permits the lid 30 to be slid down over the top of the base 18 as shown in FIG. 6.

The base 18 and lid 30 may be connected with one or more hinges 54. One hinge design that has proven suitable is shown in FIG. 9, and consists of a molded plastic, U-shaped hinge 54 with two extensions 56 connected by a center bridge 58, the center bridge 58 having a thin, flexible central joint region 60 over which the bridge 58 can be bent.

The lid 30 and base 8 are placed next to each other such that the back lid wall 38 is parallel to and confronts the back wall 26 as shown in FIG. 3. Hinges 54 may then be mounted on the lid 30 and base 18 to secure them together. The inner surface 62 of one extension 56 is attached to the back wall 26 of the base 18, while the opposing inner surface 62 of the other extension 56 is attached to the back lid wall 38, using fasteners such as adhesive, rivets, thermal welds, or screws. Two or more hinges 54 should be used, placing at least one hinge 54 near each side wall 22 or side lid wall 34. To permit the lid 30 to completely fit over the base 18 and form a dust tight seal between the interior and exterior of the case 12, it may be necessary to limit the height of the back lid wall 38 as seen in FIG. 4 so that when the case 12 is assembled, the back lid wall 38 merely covers any gaps between the lid panel 32 and the back wall 26 of the base 18. If desired, the lid 30 may be fashioned to fit inside the base 28 by making the lid panel 32 slightly smaller than the base panel 20.

Snap-locks 64 may be formed in the lid 30 and base 18 as seen in FIGS. 7 and 8 to keep the case 12 securely shut during transit. The snap-locks 64 are formed by molding angular projections 66 on the outside surface 68 of the front wall 24 of the base, and on a corresponding location on the inside surface 70 of the front lid wall 36, so that when the lid 30 is slid over the base 18, the angular projections 66 will slide past each other in one direction, and become hooked to hold the case 12 closed.

A shallow tray 14, molded from the same plastic as the base 18 and having a bottom tray panel 73, side walls 74, and partitions 76, may be inserted into the base 18. The tray 14 may preferably be one of two sizes. The first size tray 78 shown in FIG. 11, should be large enough to hold four boxed 5¼" data cartridges 80 with the partitions 76 situated in a pattern so these are two rows of two data cartridges 80 oriented lengthwise across the tray 78. The second size tray 82 shown in FIG. 12, should be large enough to hold eight boxed 3½" data cartridges 84 with the partitions 76 situated in a pattern so there are two rows of four data cartridges 84 oriented transversely across the tray 82. The orientation of the 3½" data cartridges 84 is perpendicular to the pattern of the 5¼" data cartridges 80. The partitions 76 may include thumb notches 86 in the top edge of each partition 76 to permit the data cartridges 80, 84 to be lifted out from the sides or ends.

The horizontal dimensions of the base 18 must be large enough to fit either sized tray 78, 82, and the base 18 must be deep enough to accommodate the thicker of the two cartridges 80, 84. Each tray 78, 82 may have guide tabs 88 extending outward from the side walls 74 of the tray 78, 82 so that the overall horizontal dimensions of the trays 78, 82 including the guide tabs 88 are equal to the inside dimensions of the base 18 and the trays 78, 82 will not shift or slide within the base. Vertical feet tabs 90 protruding downward from the bottom of the tray 78, 82 may be incorporated to hold the tray 78, 82 and data cartridges 80, 84 against the lid 30 when the case 12 is closed, to prevent the data cartridges 80, 84 from rattling in the tray 78, 82 when the case 12 is held by the handle 44.

The tray 14 may also take the form of an array of interconnected partitions 76 molded together and having no bottom tray panel 73 as shown in FIGS. 13 and 14, which merely holds the data cartridges 80, 84 in place in a pattern with the partitions 76 interposed between the cartridges 80, 84. If it is still desirable to use the tray 14 to lift the cartridges 80, 84 out of the case 12, the partitions 76 may have support tabs 75 projecting at right angles from the bottom edges of the partitions 76.

The length and width dimensions of the case 12 must be greater than the length and width of the tray 14, which must in turn be large enough to hold the date cartridges 80, 84. The case 12 may be made deep enough to hold more than one tray 14 stacked one on top of another, so that different sized cartridges 80, 84 may be carried in the same case 12 by using two different trays 14.

Referring to FIG. 1, the shelving module 16 has a housing 92 stamped or cut from metal sheeting to form a generally rectangular blank, approximately as wide as the distance between the front lid wall 36 and back lid wall 38 of the case 12, with rounded corners 96, a middle, top wall section 98 defined by parallel lines 100 spaced a distance apart slightly greater than the distance between the side lid walls 34 of the case 12. Side wall sections 102 on each side of the middle region 98 are defined by parallel lines 104 a distance from the adjacent parallel lines 100 slightly greater than the sum of three times the depth of the case 12 plus two times the thickness of metal used to form the housing 92. End segments 106 as wide as the radius of the curve of the rounded corners 96 extend from the side wall sections 102. Two shelf brackets 108 are stamped or cut from the same type metal sheeting to form generally rectangular blanks having rounded corners 112 and a center region 114 defined by parallel lines 116 slightly wider apart than the depth of a case 12, with support segments 118 as wide as the radius of the curve of the rounded corners 112 extending from each side of the center regions 114. The radius of the corners 112 of the shelf brackets 108 should equal the radius of the corners 96 on the housing 92.

The housing 92 is folded ninety degrees over each of the parallel lines 100, 104 to form the upright, box-shaped shelf module 14. The shelf bracket 108 is folded ninety degrees over each of the parallel line 116 to form the U-shaped shelf bracket 108.

The shelf brackets 108 are then attached to the inside surfaces 120 of the housing 92 so that the parallel lines 116 of the shelf bracket 108 are parallel to the parallel lines 100 of the housing 92, with the support segments 118 projecting inward from opposing sides of the housing 92. The shelf bracket 108 should be vertically spaced on side walls 102 so that a case 12 would fit between the shelf bracket 108 and the top wall 98 of the housing 92, and so a case 12 would fit between the shelf bracket 108 and the end segments 106 of the housing 92. End segments 106 support housing 92 on a desk or table top.

Holes 122 may be drilled through the corners 96 of the end segments 106, and the housing 92 may then be inverted and mounted under a desk or table using screws inserted through holes 122. Rear stops 124 may also be attached to the back of the housing 92 to prevent cases 12 from sliding completely through the housing 92.

In operation, the lid 30 of the case 12 may be pivoted open on the hinges 54 as shown in FIG. 1, and the appropriate sized tray 78, 82 selected and inserted in the base 18. Data cartridges 80, 84 may be inserted between the partitions 76 of the tray 78, 82 and the lid 30 closed and snapped shut using the snaplocks 64. The case 12 may then be picked up and carried by the handle 44, or inserted into the shelving module 16 for storage, by sliding the case 12 into the desired location between the shelf brackets 108 and top wall section 98 of the housing 92, between the support segments 118 of the shelf brackets 108, or between the support segments 118 of the shelf brackets 108 and the end segments 106 of the housing 92.

A case 12 may be removed from the shelving module 16 by grasping the handle 44 and sliding the case 12 out. The case 12 may be opened by pulling the front lid wall 36 away from the front wall 24 of the base 18 to disengage the snap-locks 64. Data cartridges 80, 84 and trays 78, 82 may then be removed or inserted as desired.

What is claimed is:

1. A data cartridge handling system for storing and transporting a plurality of data cartridges, said data cartridges being of at least one type selected from varied sizes of data cartridges, said system comprising:

at least one carrying case having a length and a width dimension, said carrying case having a gripping handle thereon, a base, a lid hingedly attached to said case for swinging movement between an open position and a closed position in covering relation to said base such that a generally dust tight seal is formed between an interior region and an exterior region of the case, and means to secure said lid in said closed position;

means for removably and engagingly receiving one or more of the data cartridges of a first type selected from the varied sizes in a first pattern or for receiving one or more of the data cartridges of a second type selected from the varied sizes in a second pattern within said base of said carrying case, said means comprising a first array of interconnected partitions corresponding to said first pattern such that said first array of partitions may be disposed between the data cartridges of the first type, and a second array of interconnected partitions corresponding to said second pattern such that said second array of partitions may be disposed between the data cartridges of the second type, said first and second arrays of partitions each being selectively and removably insertable within said case, said first and second arrays of partitions each having a length and width corresponding to said length and width dimensions of said case;

a shelf module for removably and slidably receiving a plurality of said carrying cases.

2. The system of claim 1 wherein the base of the case has a base panel having edges and four base side walls connected to and extending upward generally perpendicularly from said edges of said base panel, and the lid of the case has a lid panel having edges and four lid side walls connected to and extending upward generally perpendicularly from said edges of said lid panel, said lid panel being larger than said base panel as measured between the corresponding edges thereof such that the lid may be inverted and slid snugly over the base with said base side walls being positioned inside the lid side walls.

3. The system of claim 2 wherein the means to secure the lid further comprises:
   at lease one angular projection extending from one of the base side walls;
   at least one angular projection extending from one of the lid side walls and oriented opposite to and aligned to slidably engage with at least one of said corresponding angular projections extending from the base side walls.

4. The system of claim 2 wherein the handle is connected to one of the base side walls of the case in an outwardly facing exposed position when the case is slidably received within the shelf module, whereby the handle may be grasped for removal of the case from the shelf module.

5. The system of claim 1 wherein the shelf module is comprised of a housing having a top wall, at least two side walls connected to and extending from said top wall, and at least a pair of end segments projecting inwardly of said housing from said side walls.

6. The system of claim 1 wherein the housing may be inverted and one or more fasteners connected to the end segments to support the housing in an inverted position.

* * * * *